United States Patent
Zhang et al.

(10) Patent No.: US 9,692,674 B1
(45) Date of Patent: Jun. 27, 2017

(54) NON-PARAMETRIC CHANGE POINT DETECTION

(71) Applicant: Google Inc., Mountain View, CA (US)

(72) Inventors: Xinyi Zhang, San Jose, CA (US); Kevin Yu, Palo Alto, CA (US); Matthew Lawlor, Oakland, CA (US)

(73) Assignee: Google Inc., Mountain View, CA (US)

( * ) Notice: Subject to any disclaimer, the term of this patent is extended or adjusted under 35 U.S.C. 154(b) by 693 days.

(21) Appl. No.: 14/144,099

(22) Filed: Dec. 30, 2013

(51) Int. Cl.
*H04L 12/26* (2006.01)

(52) U.S. Cl.
CPC ......... *H04L 43/0876* (2013.01); *H04L 43/04* (2013.01)

(58) Field of Classification Search
None
See application file for complete search history.

(56) References Cited

U.S. PATENT DOCUMENTS

| | | | |
|---|---|---|---|
| 4,291,269 A | 9/1981 | Nossen | |
| 6,023,295 A * | 2/2000 | Pau | H04N 19/50 375/240.04 |
| 6,625,569 B2 | 9/2003 | James et al. | |
| 6,877,043 B2 | 4/2005 | Mallory et al. | |
| 7,080,290 B2 | 7/2006 | James et al. | |
| 7,523,016 B1 | 4/2009 | Surdulescu et al. | |
| 7,620,868 B2 | 11/2009 | Tailliet et al. | |
| 7,716,011 B2 | 5/2010 | Thibaux et al. | |
| 7,802,165 B2 | 9/2010 | Jain et al. | |
| 7,869,544 B2 | 1/2011 | Sorna et al. | |
| 7,882,230 B2 * | 2/2011 | Appleby | H04L 67/1008 709/226 |
| 8,090,592 B1 | 1/2012 | Goodall et al. | |
| 8,504,882 B2 | 8/2013 | Li et al. | |
| 8,806,313 B1 | 8/2014 | Yu et al. | |
| 8,812,586 B1 | 8/2014 | Kulkarni et al. | |
| 8,868,993 B1 | 10/2014 | Yu et al. | |
| 8,949,677 B1 | 2/2015 | Brundage et al. | |
| 8,954,361 B1 | 2/2015 | Phillips et al. | |

(Continued)

OTHER PUBLICATIONS

Bandara, Vidarshana W., et al., "Extracting Baseline Patterns in Internet Traffic Using Robust Principal Components" 36th Annual IEEE Conference on Local Computer Networks, IEEE, Oct. 2011.

(Continued)

*Primary Examiner* — Joshua Joo
(74) *Attorney, Agent, or Firm* — McDermott Will & Emery LLP

(57) ABSTRACT

Described herein are systems, mediums, and methods for simultaneously determining multiple types of changes in time series data. A plurality of potential change points may be selected in a signal representing the time series data. For each potential change point the signal may be a split into two segments including data points before and data points after the potential change point, respectively. Estimate of cumulative distribution function for each segment may be determined. A normalized difference of the respective estimates of cumulative distribution functions may be determined. The normalized difference may be compared to a threshold value to determine whether the potential change point qualifies as valid change point. The techniques discussed herein may determine at least two valid change points representing at least two different types of changes in the signal.

12 Claims, 6 Drawing Sheets

(56) References Cited

U.S. PATENT DOCUMENTS

| | | | |
|---|---|---|---|
| 9,471,544 | B1 | 10/2016 | Yu et al. |
| 2002/0055826 | A1 | 5/2002 | Wegerich et al. |
| 2003/0079160 | A1* | 4/2003 | McGee .............. G06F 11/0709 714/39 |
| 2003/0126289 | A1 | 7/2003 | Aggarwal et al. |
| 2005/0220030 | A1 | 10/2005 | Nagami et al. |
| 2005/0234667 | A1 | 10/2005 | Hilton |
| 2008/0052784 | A1 | 2/2008 | Wiley et al. |
| 2008/0082299 | A1* | 4/2008 | Samardzija .......... G05B 23/021 702/187 |
| 2008/0153423 | A1* | 6/2008 | Armstrong ............ H04W 24/06 455/67.14 |
| 2008/0196100 | A1 | 8/2008 | Madhavan et al. |
| 2008/0271038 | A1 | 10/2008 | Rolia et al. |
| 2009/0017758 | A1 | 1/2009 | Dorneich et al. |
| 2009/0018798 | A1 | 1/2009 | Dorneich et al. |
| 2009/0125714 | A1* | 5/2009 | Khosmood ......... H04L 63/1458 713/154 |
| 2010/0023282 | A1 | 1/2010 | Lewis et al. |
| 2010/0027432 | A1 | 2/2010 | Gopalan et al. |
| 2010/0071061 | A1 | 3/2010 | Crovella et al. |
| 2010/0106752 | A1 | 4/2010 | Eckardt et al. |
| 2010/0290346 | A1 | 11/2010 | Barford et al. |
| 2011/0016360 | A1 | 1/2011 | Borghetti et al. |
| 2011/0119374 | A1 | 5/2011 | Ruhl et al. |
| 2011/0173015 | A1 | 7/2011 | Chapman et al. |
| 2011/0276887 | A1 | 11/2011 | Cohen et al. |
| 2012/0140671 | A1 | 6/2012 | Bukofser et al. |
| 2013/0085715 | A1 | 4/2013 | Lakshminarayan et al. |
| 2013/0173215 | A1 | 7/2013 | Patankar et al. |
| 2013/0227116 | A1* | 8/2013 | Radhakrishnan ... H04L 41/0823 709/224 |
| 2014/0114609 | A1* | 4/2014 | Maurer .............. H03H 21/0016 702/179 |
| 2014/0172382 | A1 | 6/2014 | Andrews et al. |
| 2015/0082432 | A1* | 3/2015 | Eaton ................... H04L 47/785 726/23 |

OTHER PUBLICATIONS

Bosco, Bruno, et al. "A robust multivariate long run analysis of European electricity prices," Nota di Lavoro, vol. 103, Sep. 2007, 29 pages.
Chen, Thomas M. Network traffic modeling. Chapter 3, The Handbook of Computer Networks, Hossein Bidgoli (ed.), Wiley, 2007.
Conti, P.L., et al. "Traffic Modeling and Statistical Analysis in Network Tomography," Retrieved from URL: http://sco2011.stat.unipd.it/Public/conti_sco_2011.pdf on Dec. 16, 2016, 6 pages.
Du, Ping, et al. "Detecting and tracing Traffic Volume Anomalies in SINET3 Backbone Network," 2008 IEEE International Conference on Communications, May 2008.
Escribano, Alvaro, et al. "Modelling Electricity Prices: International Evidence," Working Paper 02-27, Economics Series 08, departamento de Economia, Universidad Carlos III de Madrid, Spain, Jun. 2002, 32 pages.
Harvey, A. C., et al. "Cyclical Components in Economic Time Series: A Bayesian Approach," Oct. 28, 2002, 48 pages. Retrieved from URL: http://repub.eur.nl/pub/540/ on Dec. 16, 2016.
Harvey, Andrew C., et al. "Trends and Cycles in Economic Time Series: A Bayesian Approach," Journal of Econometrics, vol. 140, Oct. 2007, pp. 618-649.
Hellerstein, Joseph M. "Quantitative Data Cleaning for Large Databases," Feb. 27, 2008, United Nations Economic Commission for Europe.
Notice of Allowance issued Sep. 23, 2016 in U.S. Appl. No. 13/827,144.
Office Action issued Jan. 16, 2015 in U.S. Appl. No. 13/483,601.
Office Action issued Aug. 12, 2014 in U.S. Appl. No. 13/480,124.
Office Action issued Aug. 26, 2014 in U.S. Appl. No. 13/488,875.
Office Action issued Feb. 11, 2015 in U.S. Appl. No. 13/446,842.
Office Action issued Aug. 26, 2014 in U.S. Appl. No. 13/446,842.
Office Action issued Jun. 22, 2015 in U.S. Appl. No. 13/446,842.
Advisory Action issued Oct. 2, 2015 in U.S. Appl. No. 13/446,842.
Office Action issued Jul. 27, 2015 in U.S. Appl. No. 13/827,144.
Office Action issued Jul. 7, 2015 in U.S. Appl. No. 13/826,994.
Office Action issued Dec. 22, 2015 in U.S. Appl. No. 13/826,994.
Office Action issued Nov. 5, 2013 in U.S. Appl. No. 13/480,084.
Notice of Allowance issued Apr. 10, 2014 in U.S. Appl. No. 13/480,084.
Office Action issued Jan. 14, 2016 in U.S. Appl. No. 13/569,688.
Office Action issued Jul. 1, 2016 in U.S. Appl. No. 13/569,688.
Notice of Allowance issued Sep. 22, 2016 in U.S. Appl. No. 13/569,688.
Office Action issued Mar. 7, 2016 in U.S. Appl. No. 13/827,144.
Office Action issued Aug. 13, 2015 in U.S. Appl. No. 13/480,042.
Notice of Allowance issued Dec. 15, 2015 in U.S. Appl. No. 13/480,042.
Notice of Allowance issued Mar. 23, 2016 in U.S. Appl. No. 13/480,042.
Notice of Allowance issued Jul. 6, 2016 in U.S. Appl. No. 13/480,042.
Mahmoud, Mahmoud A. et al. "A Change Point Method for Linear Profile Data," May 23, 2006, Quality and Reliability Engineering International, vol. 23, No. 2, pp. 247-268, John Wiley & Sons.
Malliga, S. et al., "Filtering Spoofed Traffic at Source End for Defending Against DoS/DDos Attacks," Proceedings of the 2008 International Conference on Computing, communication and Networking, IEEE, Dec. 2008.
Patcha, A. et al., "An overview of anomaly detection techniques; existing solutions and latest technological trends", Computer Networks, vol. 51, Issue 12, pp. 3448-3470, Aug. 22, 2007.
Punskaya, Elena, et al. Bayesian Curve Fitting Using MCMC With Applications to Signal Segmentation, IEEE Transactions on Signal Processing, vol. 50, No. 3, Mar. 2002, pp. 747-758.
Schleip, Christoph. Climate change detection in natural systems by Bayesian methods. Doctoral dissertation, Technische Universität München, 2009, 139 pages.
Yang, Lili. "Sample Based Estimation of Network Traffic Flow Characteristics" Thesis, Statistics, University of Michigan, 130 pages, 2009.
Yang, L. et al. "Sampled based estimation of network traffic flow characteristics." In IEEE Infocom 2007—26th IEEE International Conference on Computer Communications, pp. 1775-1783. IEEE, Jan. 2007.
Zhang, Huiqi et al. "Change Point Detection Based on Call Detail Records," IEEE International Conference on Intelligence and Security Informatics, Jun. 8-11, 2009, IEEE.
Zhang, Michael, et al. "A Nonlinear Autoregressive Conditional Duration Model with Applications to Financial Transaction Data," Graduate School of Business, University of Chicago, Jul. 1999, 53 pages.
Listanti, Marco, et al."Architectural and Technological Issues for Future Optical Internet Networks", IEEE Communications Magazine, Sep. 2000.
Notice of Allowance issued Jan. 17, 2017 in U.S. Appl. No. 13/569,688.
Notice of Allowance issued Feb. 10, 2017 in U.S. Appl. No. 13/827,144.

* cited by examiner

NON-PARAMETRIC CHANGE POINT DETECTION

BACKGROUND

Often, data such as time series data (i.e., a chronological series of measurements of a variable) exhibits a type of change, such as a change in trend, mean shift, median shift, etc. The time series data may refer to a sequence of data points, measured typically at successive points in time spaced at uniform time intervals. In some applications, the time series data may represent an underlying process, such as the magnitude of network traffic in a network. The changes in time series data maybe indicative of a change in the underlying system.

Conventional algorithms have been developed to detect the point at which distribution of underlying time series change, i.e. change point detection. Such conventional algorithms are tied to one type of change. For example, the cumulative sum (cusum) algorithm detects mean shifts in the data, whereas the rank sum algorithm detects median shifts in the data. Accordingly, conventional techniques require building multiple detectors for simultaneous detection of multiple types of changes (e.g., mean shift, median shift, variance shifts, etc.) since each detector can only apply a single algorithm to detect a given type of change in the data. In addition, conventional techniques require indicating the types of changes to be detected. Thus, the type of the change to be detected must be known in advance.

SUMMARY

The systems, mediums and methods described herein include, among other things, a nonparametric technique for detecting arbitrary changes in data, such as time series data. The technique does not require defining the underlying distribution of the data or the types of changes that may occur in the data. Thus, the change detection technique discussed herein is independent of the distribution of the data. According to various embodiments, the change detection may be performed in an online mode (e.g. as the data is received from the data source) as well as an offline mode (e.g. after saving the data to memory and processing the saved data in batches), as discussed below in further detail.

In some embodiments, a computer-implemented method is provided. The method includes selecting a first potential change point in a signal. The method also includes identifying a first portion of the signal incorporating data points before the first potential change point. A first estimate of cumulative distribution function for the first portion of the signal may be determined. The method further includes identifying a second portion of the signal incorporating data points after the first potential change point. A second estimate of cumulative distribution function for the second portion of the signal may be determined. A normalized difference of the first estimate of cumulative distribution function and the second estimate of cumulative distribution function may be determined. The method includes determining whether the first potential change point qualifies as valid change point based on the normalized difference.

Various embodiments provide a non-transitory electronic device readable storage medium stores instructions that, when executed, cause one or more processors to select a plurality of potential change points in a signal. For each potential change point of the plurality of potential change points, the instructions may cause the one or more processors to identify a first portion of the signal incorporating data points before the potential change point; determine a first estimate of cumulative distribution function for the first portion of the signal; identify a second portion of the signal incorporating data points after the potential change point; determine a second estimate of cumulative distribution function for the second portion of the signal; determine a normalized difference of the first estimate of cumulative distribution function and the second estimate of cumulative distribution function; and determine whether the potential change point qualifies as valid change point based on the normalized difference. The instructions further cause the one or more processors to determine at least two valid change points in the signal based on normalized differences determined for the plurality of potential change points. The at least two valid change points represents the at least two types of changes in the signal.

According to various embodiments, a non-transitory electronic device readable storage medium stores instructions that, when executed, cause one or more processors select a plurality of potential change points in a signal. The plurality of potential change points may be analyzed using a change point detector to detect at least two types of changes in the signal. The instructions further cause the one or more processors to detect, using the change point detector, at least two change points among the plurality of potential change points in the signal based on the analyzing. The at least two change points represent the at least two types of changes in the signal.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

Exemplary embodiments discussed herein concern a non-parametric technique for detecting arbitrary changes in time series data. For example, the methods described herein may detect arbitrary changes in a signal representative of network traffic data. Thus, the change in the time series data may indicate a change in the network traffic. It is desirable to find the location of changes in the data without specifying what type of change is expected. This is particularly useful if there are multiple kinds of changes, such as mean or variance shifts, to be detected simultaneously without building a detector for each kind of change. Thus, embodiments discussed below provide a single detector for simultaneous detection of multiple types of arbitrary changes (e.g., mean shift, median shift, variance shifts, etc.) in time series data. The techniques described herein do not require specification of underlying distribution of the data or characterization of the types of distribution changes that may occur.

In some exemplary embodiments, a signal representative of time series data is approximated by a sequence of independent random variables from a fixed distribution. The techniques discussed below may detect arbitrary changes in the fixed distribution. According to various embodiments, the time series data may be processed to remove autocorrelation, cyclic patterns, and/or trends using techniques available to one of ordinary skill in the art.

Figure 1:
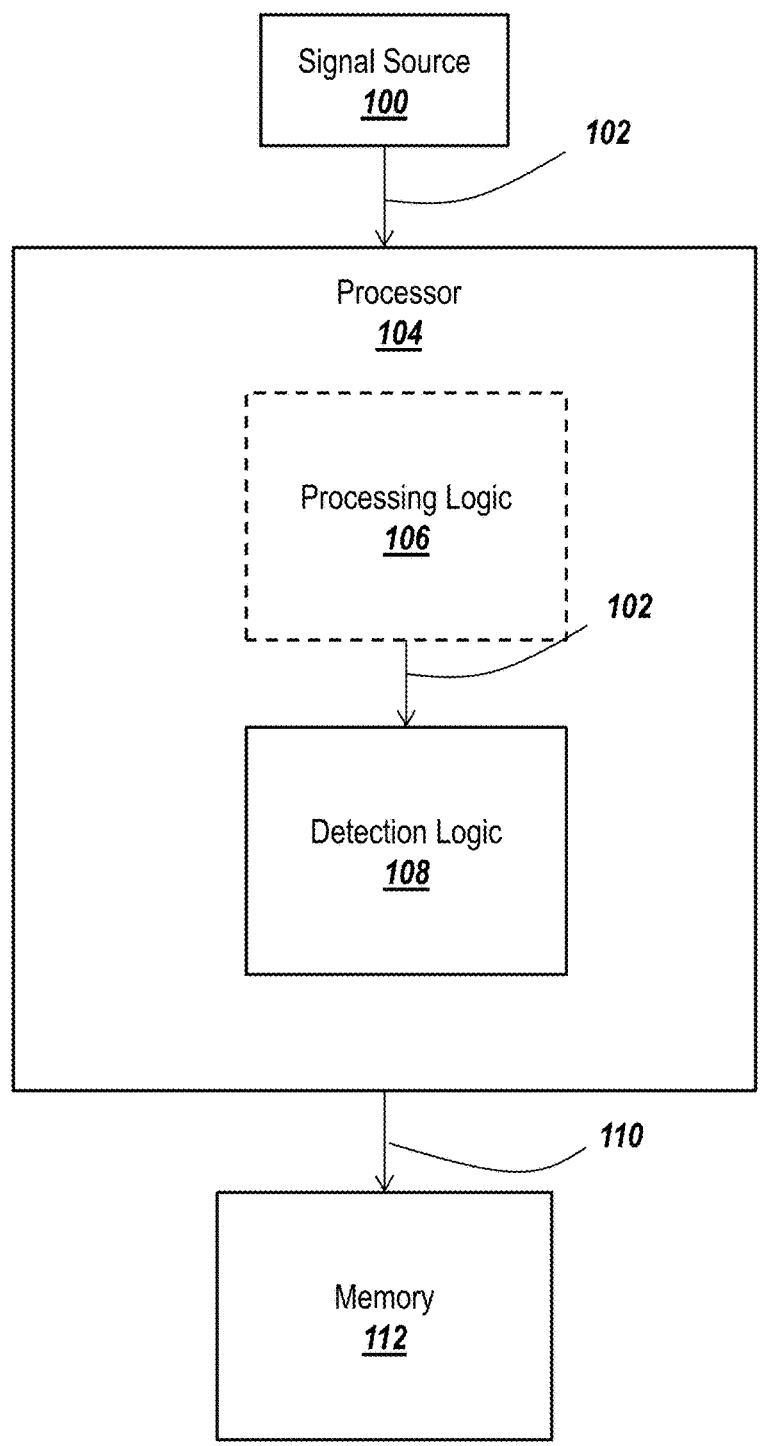
FIG. 1 depicts an exemplary processor for receiving a signal from a signal source for analysis.

FIG. 1 illustrates an exemplary processor 104. As used herein, the terms "processor" or "computing device" refer to one or more computers, microprocessors, logic devices, servers, or other devices configured with hardware, firmware, and/or software to carry out one or more of the techniques described herein. An illustrative computing device 400, which may be used to implement any of the processors described herein, is described in detail below with reference to FIG. 4.

The processor 104 may receive a signal 102 from a signal source 100. As an example, the signal source 100 may include a device that monitors an amount of traffic flow in a network, and the signal may be a vector of discrete samples corresponding to an amount of traffic flow in the network as a function of time. In an example, the signal 102 may correspond to a number of data packets arriving at a particular node in the network in a given time window such that the signal 102 may represent time series data.

The signal source 100 may further be configured to process the signal to get the signal 102 into a certain form, such as by controlling the amplitude of the signal or adjusting other characteristics of the signal. For example, the signal source 100 may quantize, filter, smooth, downsample, upsample, or interpolate the signal, or perform any number of processing techniques on the signal 102. In some embodiments, the signal source 100 may be a storage storing a digital representation of a signal. In general, any signal source may be used, if it is desirable to detect changes in trend of the provided signal.

In some embodiments, the processor 104 may include an optional processing logic 106 that may approximate the received signal 102 by a sequence of independent random variables. In some embodiments, the processor 104 may assume that the signal 102 is well approximated by a sequence of independent random variables without being processed by the processing logic 106.

The processing logic 106 may further process the signal 102 to remove or reduce any trend, cyclic pattern or autocorrelation that may be present in the signal 102. In some embodiments, the processing may be performed at the signal source 100. In one example, a trend may be characterized as long-term fluctuations in the signal 102. The trend may be linear or nonlinear. The cyclic pattern may be representative of a periodic feature repeated throughout a portion of the detrended signal.

In an exemplary embodiment, a trend is first identified and then subtracted from the signal 102, forming a detrended signal. A cyclic pattern may then be identified and then removed from the detrended signal to form a residual signal. Any suitable technique, including but not limited to filtering and signal decomposition, for removing trend and/or cyclic pattern components may be used. The employed technique may depend upon the application being addressed.

Detection logic 108 of the processor 104 may identify multiple types of changes in the signal 102 or the residual signal. The detection logic 108 may receive a selection of potential change points in the signal 102. For each potential change point, the signal may be divided into two segments, the first segment encompassing the data points before the potential change point and the second segment encompassing the data points after the potential change point. The detection logic 108 may compute an estimate of cumulative distribution functions of the first segment and second segment, respectively. Then, the detection logic 108 may compute a normalized difference of the estimates of cumulative distribution functions. The detection logic 108 may compare the normalized difference to a threshold value to determine whether the potential change point is an actual, i.e. valid, change point. An exemplary algorithm applied by the detection logic 108 is described in further detail in connection with FIGS. 2-3.

The identified change points 110 may be saved to memory 112. In some embodiments, the detection logic 108 may process the signal 102 online, i.e. as the time series data is received from the signal source 100. Alternatively, the detection logic 108 may process the signal 102 offline, i.e. processing the entire time series data saved to memory 112 in one pass.

Figure 2A:
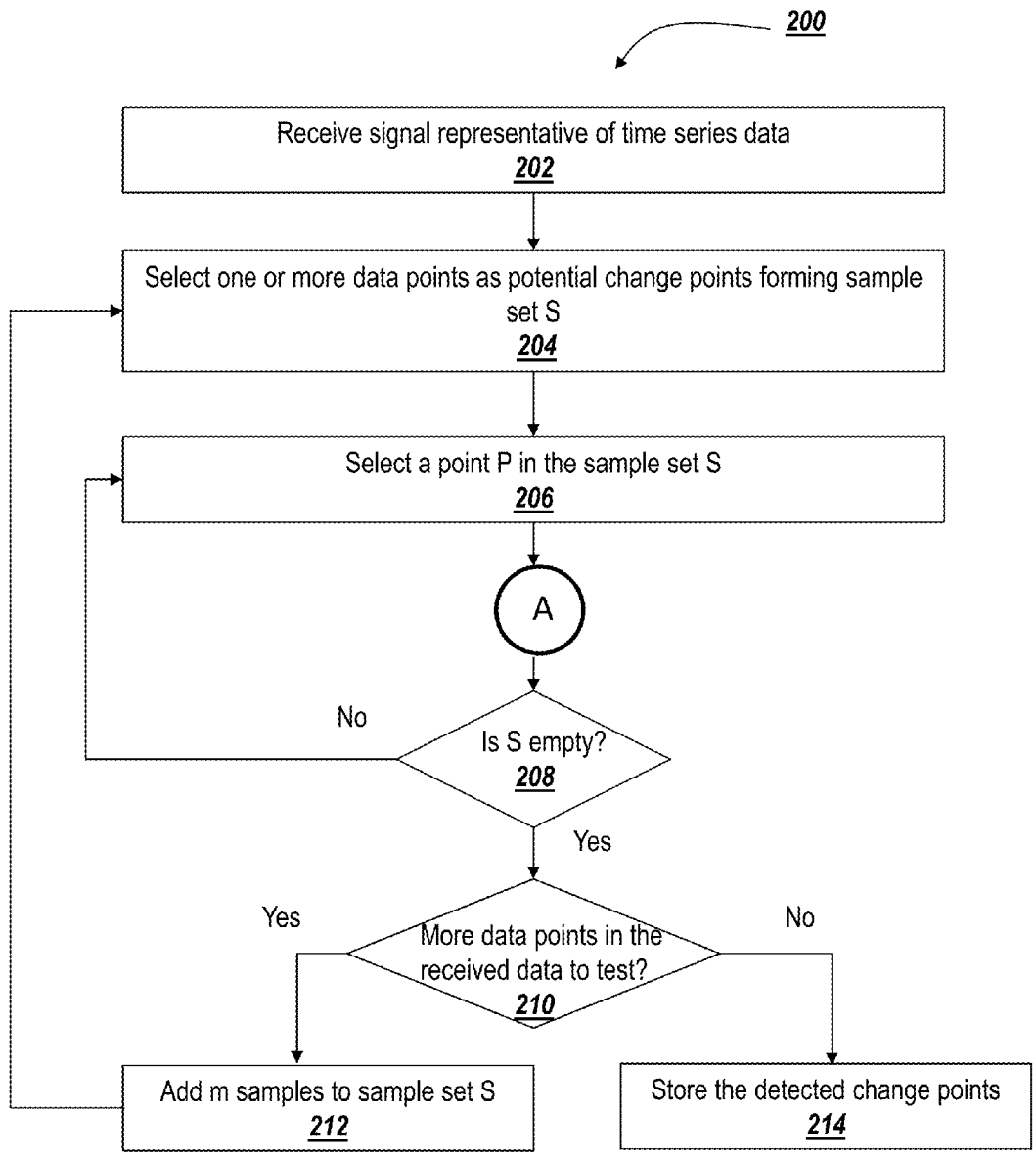
FIG. 2A is a flowchart describing a method performed by the processor in accordance with an exemplary embodiment.
Figure 2B:
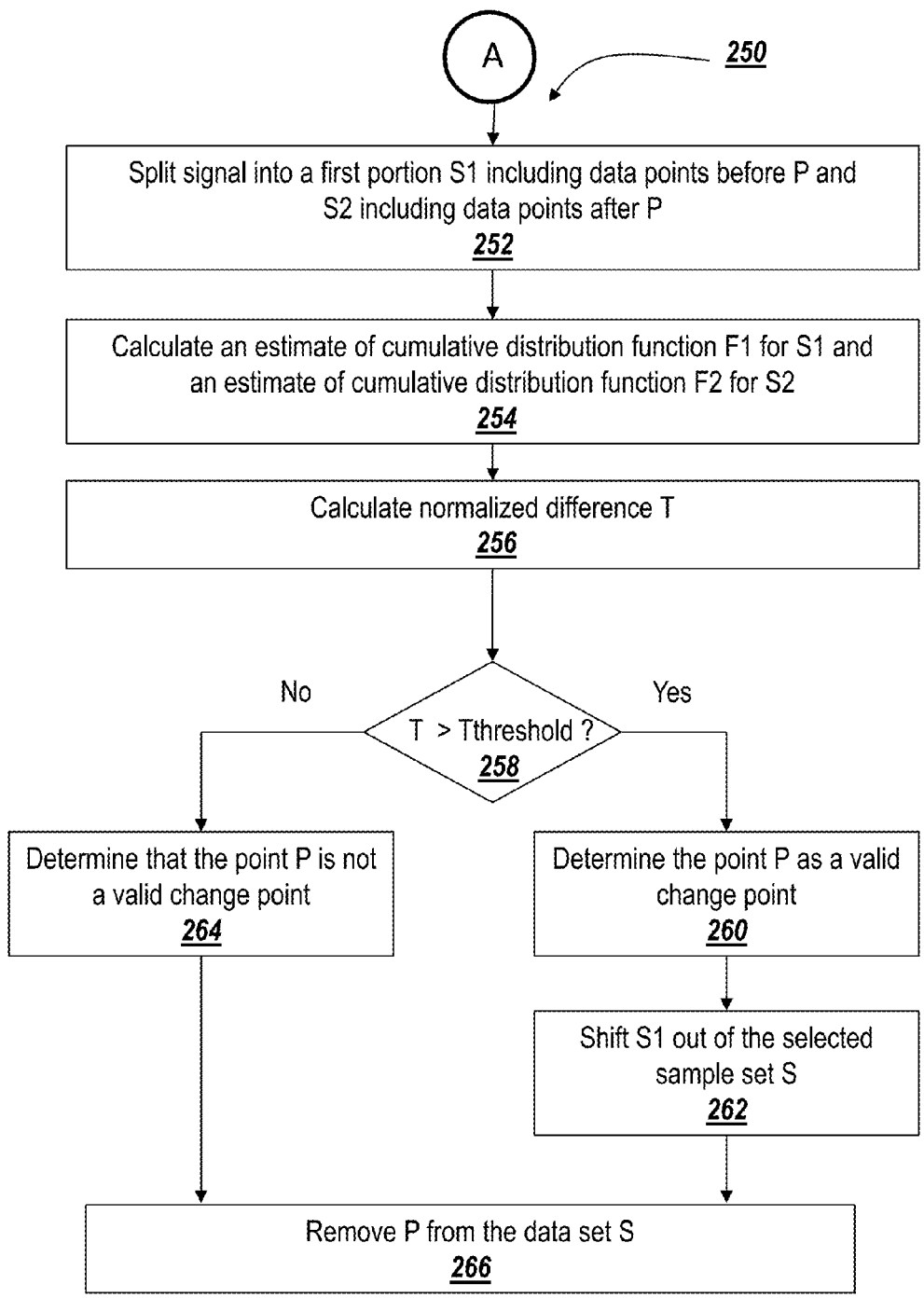
FIG. 2B is a flowchart describing a method for identifying an arbitrary change point in the received data.

FIGS. 2A-2B illustrate an exemplary algorithm for simultaneously detecting multiple types of changes in a signal without identifying the underlying distribution of the signal or indicating the types of changes to be detected. The steps illustrated in FIGS. 2A-2B may be performed by, for example, the detection logic 108 of the processor 104 illustrated in FIG. 1.

Referring to FIG. 2A, at step 202, the detection logic may receive the signal representative of time series data. At step 204, one or more data points of the signal may be selected as potential change points. The selected data points may form a sample set S. In some embodiments, the data points may be selected programmatically. Alternatively, the detection logic may receive input, such as user input, selecting the data points.

The change point detection algorithm A may be applied to each point of the sample set S. Accordingly, at step 206, a point P is selected in the sample set S. The change point detection algorithm A is applied to the selected point P to determine whether the point P is a valid change point. The details of the change point detection algorithm A is discussed in greater detail below in connection with FIG. 3.

At decision step 208, it is determined whether there are more data points in sample set S. That is, it is determined whether there are additional potential change points that need to be tested using the change point detection algorithm A. If the sample set S is not empty (NO to step 208), the detection logic determines that there are additional potential change points for testing, and the method 200 returns to step 206. Another point P' is selected in the sample set S and tested using change point detection algorithm A.

On the other hand, if the sample set S empty (YES to step 208), the method 200 proceeds to step 210. At decision step 210, the detection logic determines whether there are more samples in the received signal that need to be tested. If there are more samples (YES to step 210), the method 200 proceeds to step 212. At step 212, m samples are added to the sample set S and the method returns to step 204.

If there are no more samples in the data set for testing (NO to step 210), the method proceeds to step 214. At step 214, the detected change points may be saved to the memory.

FIG. 2B illustrates an exemplary change point detection algorithm A. At step 252, after a potential change point P is selected in the sample set S (step 206 of FIG. 2A), the detection logic splits the signal into two portion, a first portion $S_1$ that includes data points before the point P and a second portion $S_2$ that includes data points after the point P.

At step 254, the detection logic calculates an estimate of cumulative distribution function $F_1$ for $S_1$ and an estimate of cumulative distribution function $F_2$ for $S_2$. For example, the cumulative distribution function may be expressed as: $F_X(x)=\int_{-\infty}^{x} f_X(t)dt$, where $f_X(t)$ is the probability density function. The cumulative distribution function $F_X(x)$ represents the probability of the random variable X having a value less than or equal to x. In some embodiments, the estimate of cumulative distribution function may be calculated as:

$$F_1(x) = \frac{\text{number of points} \le x \text{ in } s_1}{|s_1|} \quad F_2(x) = \frac{\text{number of points} \le x \text{ in } s_2}{|s_2|}$$

where $|S_1|$ represents the sample size of the first portion $S_1$ of the signal and $|S_2|$ represents the sample size of the second portion Ss of the signal.

At step 256, normalized difference of $F_1(x)$ and $F_2(x)$ is calculated as follows:

$$T = sup_x |F_1(x) - F_2(x)| * \sqrt{\frac{|S_1| + |S_2|}{|S_1| * |S_2|}}$$

The normalized difference T is distributed according to the Kolmogorov distribution under the hypothesis that no change in distribution of the received signal has occurred.

At decision step 258, the normalized difference T is compared to a threshold value Tthreshold. In some embodiments, the threshold may be set as 0.05, for example. If the normalized difference T is larger than the threshold value Tthreshold (YES to step 258), the detection logic may determine that the selected point P is a valid change point at step 260.

At step 262, after it is determined that the selected point is a valid change point, the first portion $S_1$ of the signal may be shifted out of the sample set S. The change point P may also be removed from the sample set S at step 266. That is, only the second portion $S_2$ of the signal remains in the sample set S. The algorithm continues with step 208 of FIG. 2A where it is determined whether the sample S is empty. Thus, the change point detection algorithm A may be repeated using only the data points after the detected change point P.

If the normalized difference T is less than or equal to the threshold value Tthreshold (NO to step 258), the detection logic may determine that the selected point P is a not valid change point at step 264. At step 266, the change point P may be removed from the sample set S. The algorithm continues with step 208 of FIG. 2A where it is determined whether the sample S is empty.

Figure 3:
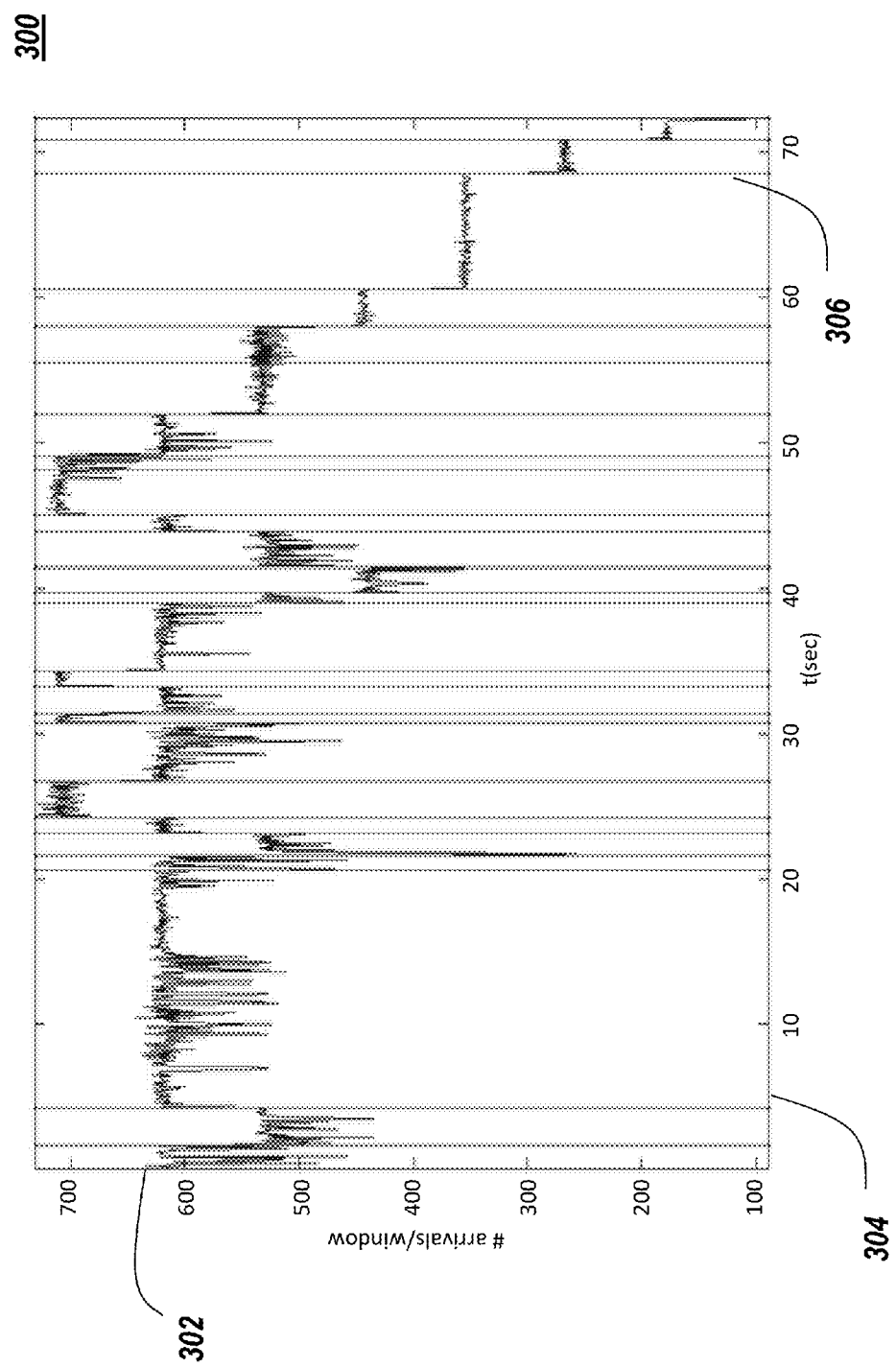
FIG. 3 depicts a graph illustrating an exemplary network traffic.

Using the exemplary algorithm illustrated in FIGS. 2A-2B, multiple types of changes may be simultaneously detected in a signal without identifying the underlying distribution of the signal or indicating the types of changes to be detected. FIG. 3 illustrates an exemplary graph 300 representing network traffic in a communications network. The graph 300 illustrates packet arrival rate 302 over time 304, for example, for a file copying service with automatic rate control. When network usage is high, the service may automatically reduce file transfer rate. Vertical lines 306 illustrate when the automatic rate control happens. Using the exemplary algorithm illustrated in FIGS. 2A-2B, the changes in the file transfer rate may be detected without identifying the underlying distribution of the signal and without specifying the type of change to be detected, i.e. the change in file transfer rate.

Figure 4:
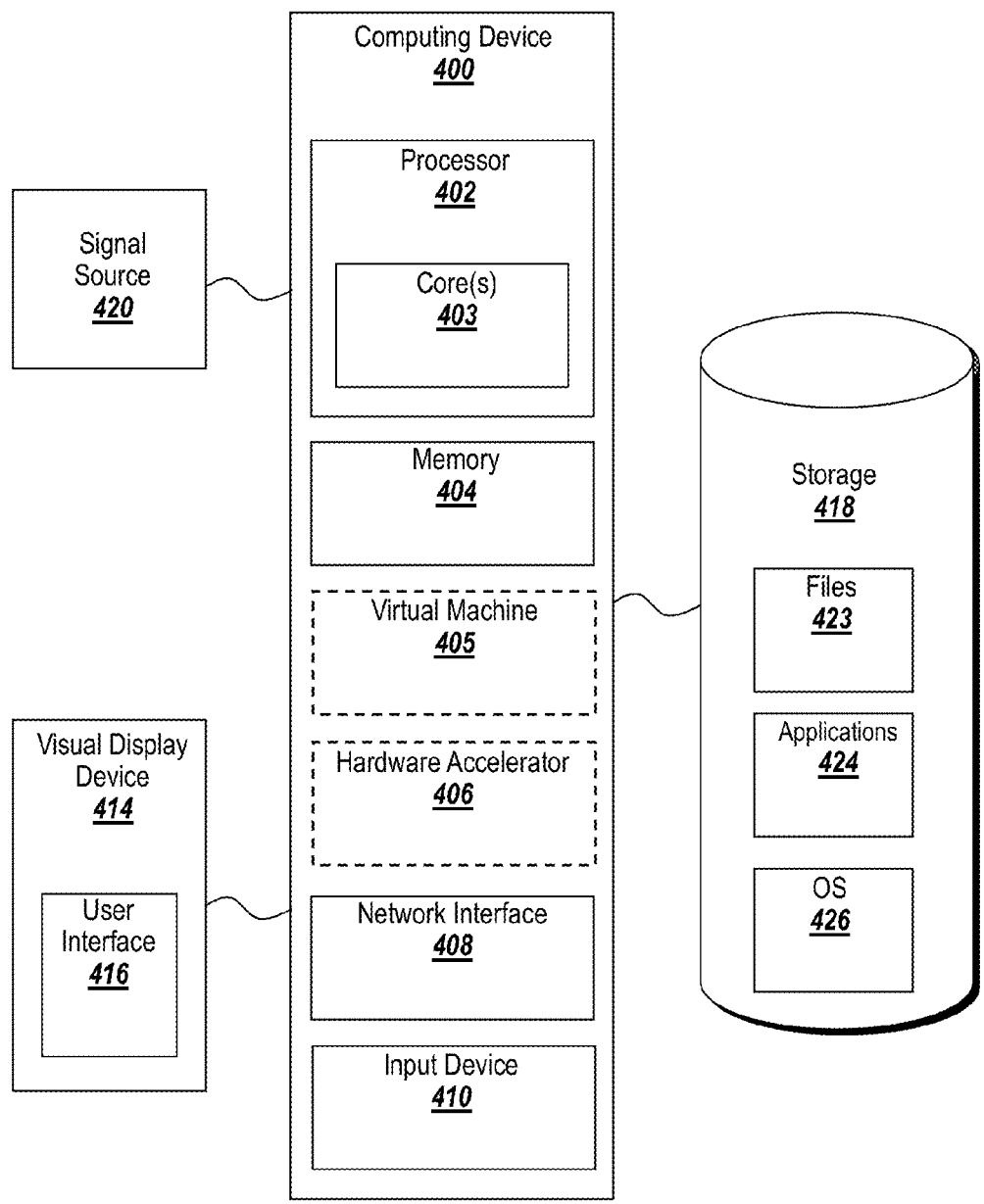
FIG. 4 depicts an exemplary computing device suitable for use with exemplary embodiments described herein.

One or more of the above-described acts may be encoded as computer-executable instructions executable by processing logic. The computer-executable instructions may be stored on one or more non-transitory computer readable media. One or more of the above described acts may be performed in a suitably-programmed electronic device. FIG. 4 depicts an example of an electronic device 400 that may be suitable for use with one or more acts disclosed herein.

The electronic device 400 may take many forms, including but not limited to a computer, workstation, server, network computer, quantum computer, optical computer, Internet appliance, mobile device, a pager, a tablet computer, a smart sensor, application specific processing device, etc.

The electronic device 400 is illustrative and may take other forms. For example, an alternative implementation of the electronic device 400 may have fewer components, more components, or components that are in a configuration that differs from the configuration of FIG. 4. The components of FIG. 4 and/or other figures described herein may be implemented using hardware based logic, software based logic and/or logic that is a combination of hardware and software based logic (e.g., hybrid logic); therefore, components illustrated in FIG. 4 and/or other figures are not limited to a specific type of logic.

The processor 402 may include hardware based logic or a combination of hardware based logic and software to execute instructions on behalf of the electronic device 400. The processor 402 may include logic that may interpret, execute, and/or otherwise process information contained in, for example, the memory 404. The information may include computer-executable instructions and/or data that may implement one or more embodiments of the invention. The processor 402 may comprise a variety of homogeneous or heterogeneous hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), or other types of processing logic that may interpret, execute, manipulate, and/or otherwise process the information. The processor may include a single core or multiple cores 403. Moreover, the processor 402 may include a system-on-chip (SoC) or system-in-package (SiP).

The electronic device 400 may include one or more tangible non-transitory computer-readable storage media for storing one or more computer-executable instructions or software that may implement one or more embodiments of the invention. The non-transitory computer-readable storage media may be, for example, the memory 404 or the storage 418. The memory 404 may comprise a ternary content addressable memory (TCAM) and/or a RAM that may include RAM devices that may store the information. The RAM devices may be volatile or non-volatile and may include, for example, one or more DRAM devices, flash memory devices, SRAM devices, zero-capacitor RAM (ZRAM) devices, twin transistor RAM (TTRAM) devices, read-only memory (ROM) devices, ferroelectric RAM (Fe-RAM) devices, magneto-resistive RAM (MRAM) devices, phase change memory RAM (PRAM) devices, or other types of RAM devices.

One or more computing devices 400 may include a virtual machine (VM) 405 for executing the instructions loaded in the memory 404. A virtual machine 405 may be provided to handle a process running on multiple processors so that the process may appear to be using only one computing resource rather than multiple computing resources. Virtualization may be employed in the electronic device 400 so that infrastructure and resources in the electronic device may be shared dynamically. Multiple VMs 405 may be resident on a single computing device 400.

A hardware accelerator 406, may be implemented in an ASIC, FPGA, or some other device. The hardware accelerator 406 may be used to reduce the general processing time of the electronic device 400.

The electronic device 400 may include a network interface 408 to interface to a Local Area Network (LAN), Wide Area Network (WAN) or the Internet through a variety of connections including, but not limited to, standard telephone lines, LAN or WAN links (e.g., T1, T3, 46 kb, X.25), broadband connections (e.g., integrated services digital network (ISDN), Frame Relay, asynchronous transfer mode (ATM), wireless connections (e.g., 802.11), high-speed interconnects (e.g., InfiniBand, gigabit Ethernet, Myrinet) or some combination of any or all of the above. The network interface 408 may include a built-in network adapter, network interface card, personal computer memory card international association (PCMCIA) network card, card bus network adapter, wireless network adapter, universal serial bus (USB) network adapter, modem or any other device suitable for interfacing the electronic device 400 to any type of network capable of communication and performing the operations described herein.

The electronic device 400 may include one or more input devices 410, such as a keyboard, a multi-point touch interface, a pointing device (e.g., a mouse), a gyroscope, an accelerometer, a haptic device, a tactile device, a neural device, a microphone, or a camera that may be used to receive input from, for example, a user. Note that electronic device 400 may include other suitable I/O peripherals.

The input devices 410 may allow a user to provide input that is registered on a visual display device 414. A graphical user interface (GUI) 416 may be shown on the display device 414.

A storage device 418 may also be associated with the computer 400. The storage device 418 may be accessible to the processor 402 via an I/O bus. The information may be executed, interpreted, manipulated, and/or otherwise processed by the processor 402. The storage device 418 may include, for example, a storage device, such as a magnetic disk, optical disk (e.g., CD-ROM, DVD player), random-access memory (RAM) disk, tape unit, and/or flash drive. The information may be stored on one or more non-transient tangible computer-readable media contained in the storage device. This media may include, for example, magnetic discs, optical discs, magnetic tape, and/or memory devices (e.g., flash memory devices, static RAM (SRAM) devices, dynamic RAM (DRAM) devices, or other memory devices). The information may include data and/or computer-executable instructions that may implement one or more embodiments of the invention The storage device 418 may further store applications 424, and the electronic device 400 can be running an operating system (OS) 426. Examples of OS 426 may include the Microsoft® Windows® operating systems, the Unix and Linux operating systems, the MacOS® for Macintosh computers, an embedded operating system, such as the Symbian OS, a real-time operating system, an open source operating system, a proprietary operating system, operating systems for mobile electronic devices, or other operating system capable of running on the electronic device and performing the operations described herein. The operating system may be running in native mode or emulated mode.

One or more embodiments of the invention may be implemented using computer-executable instructions and/or data that may be embodied on one or more non-transitory tangible computer-readable mediums. The mediums may be, but are not limited to, a hard disk, a compact disc, a digital versatile disc, a flash memory card, a Programmable Read Only Memory (PROM), a Random Access Memory (RAM), a Read Only Memory (ROM), Magnetoresistive Random Access Memory (MRAM), a magnetic tape, or other computer-readable media.

Figure 5:
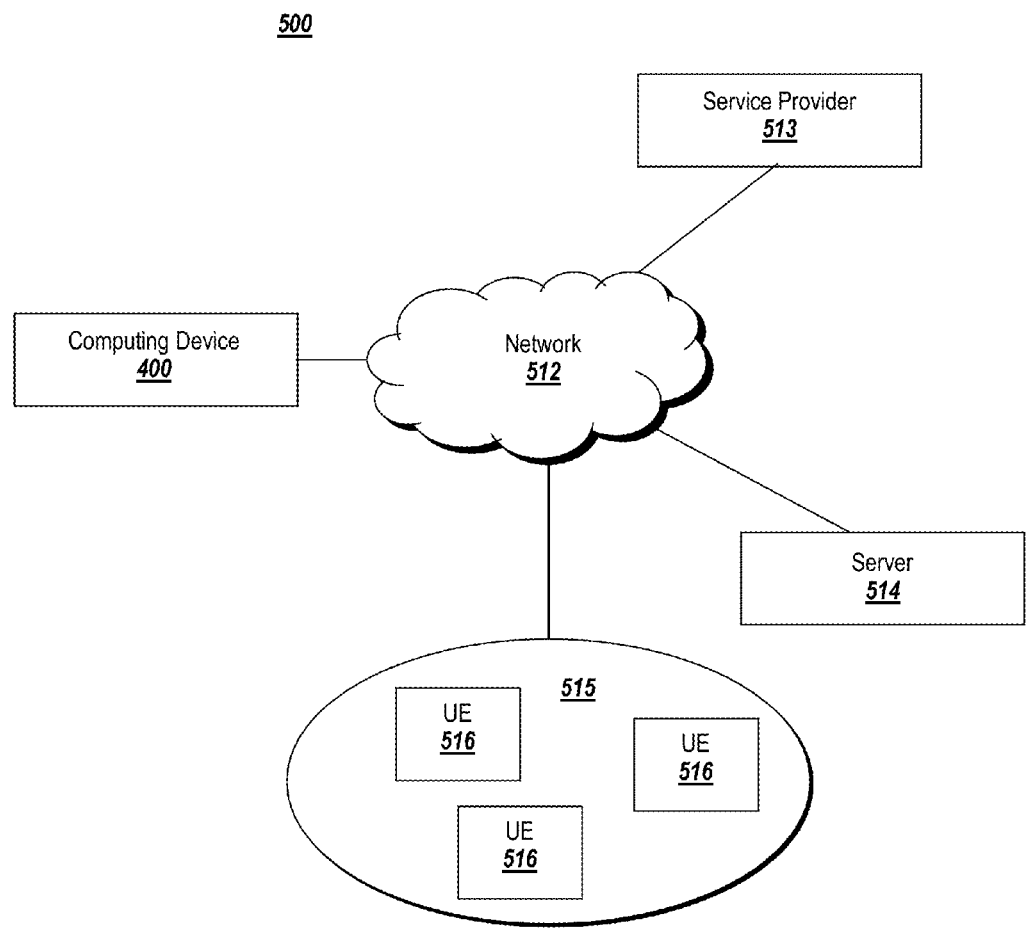
FIG. 5 depicts an exemplary network implementation of processing performed according to an exemplary embodiment.

FIG. 5 depicts a network implementation that may implement one or more embodiments of the invention. A system 500 may include a computing device 400, a network 512, a service provider 513, a target environment 514, and a cluster 515. The embodiment of FIG. 5 is exemplary, and other embodiments can include more devices, fewer devices, or devices in arrangements that differ from the arrangement of FIG. 5.

The network 512 may transport data from a source to a destination. Embodiments of the network 512 may use network devices, such as routers, switches, firewalls, and/or servers (not shown) and connections (e.g., links) to transport data. Data may refer to any type of machine-readable information having substantially any format that may be adapted for use in one or more networks and/or with one or more devices (e.g., the computing device 400, the service provider 513, etc.). Data may include digital information or analog information. Data may further be packetized and/or non-packetized.

The network 512 may be a hardwired network using wired conductors and/or optical fibers and/or may be a wireless network using free-space optical, radio frequency (RF), and/or acoustic transmission paths. In one implementation, the network 512 may be a substantially open public network, such as the Internet. In another implementation, the network 512 may be a more restricted network, such as a corporate virtual network. The network 512 may include Internet, intranet, Local Area Network (LAN), Wide Area Network (WAN), Metropolitan Area Network (MAN), wireless network (e.g., using IEEE 802.11), or other type of network The network 512 may use middleware, such as Common Object Request Broker Architecture (CORBA) or Distributed Component Object Model (DCOM). Implementations of networks and/or devices operating on networks described herein are not limited to, for example, any particular data type, protocol, and/or architecture/configuration.

The service provider 513 may include a device that makes a service available to another device. For example, the service provider 513 may include an entity (e.g., an individual, a corporation, an educational institution, a government agency, etc.) that provides one or more services to a destination using a server and/or other devices. Services may include instructions that are executed by a destination to perform an operation (e.g., an optimization operation). Alternatively, a service may include instructions that are executed on behalf of a destination to perform an operation on the destination's behalf.

The server 514 may include a device that receives information over the network 512. For example, the server 514 may be a device that receives user input from the computer 400.

The cluster 515 may include a number of units of execution (UEs) 516 and may perform processing on behalf of the computer 400 and/or another device, such as the service provider 513 or server 514. For example, the cluster 515 may perform parallel processing on an operation received from the computer 400. The cluster 515 may include UEs 516 that reside on a single device or chip or that reside on a number of devices or chips.

The units of execution (UEs) 516 may include processing devices that perform operations on behalf of a device, such as a requesting device. A UE may be a microprocessor, field programmable gate array (FPGA), and/or another type of processing device. UE 516 may include code, such as code for an operating environment. For example, a UE may run a portion of an operating environment that pertains to parallel processing activities. The service provider 513 may operate the cluster 515 and may provide interactive optimization capabilities to the computer 400 on a subscription basis (e.g., via a web service).

Units of Execution (UEs) may provide remote/distributed processing capabilities for the applications 524. A hardware unit of execution may include a device (e.g., a hardware resource) that may perform and/or participate in parallel programming activities. For example, a hardware unit of execution may perform and/or participate in parallel programming activities in response to a request and/or a task it has received (e.g., received directly or via a proxy). A hardware unit of execution may perform and/or participate in substantially any type of parallel programming (e.g., task, data, stream processing, etc.) using one or more devices. For example, a hardware unit of execution may include a single processing device that includes multiple cores or a number of processors. A hardware unit of execution may also be a programmable device, such as a field programmable gate array (FPGA), an application specific integrated circuit (ASIC), a digital signal processor (DSP), or other programmable device. Devices used in a hardware unit of execution may be arranged in many different configurations (or topologies), such as a grid, ring, star, or other configuration. A hardware unit of execution may support one or more threads (or processes) when performing processing operations.

A software unit of execution may include a software resource (e.g., a technical computing environment) that may perform and/or participate in one or more parallel programming activities. A software unit of execution may perform and/or participate in one or more parallel programming activities in response to a receipt of a program and/or one or more portions of the program. A software unit of execution may perform and/or participate in different types of parallel programming using one or more hardware units of execution. A software unit of execution may support one or more threads and/or processes when performing processing operations.

The foregoing description may provide illustration and description of various embodiments of the invention, but is not intended to be exhaustive or to limit the invention to the precise form disclosed. Modifications and variations may be possible in light of the above teachings or may be acquired from practice of the invention. For example, while a series of acts has been described above, the order of the acts may be modified in other implementations consistent with the principles of the invention. Further, non-dependent acts may be performed in parallel.

In addition, one or more implementations consistent with principles of the invention may be implemented using one or more devices and/or configurations other than those illustrated in the Figures and described in the Specification without departing from the spirit of the invention. One or more devices and/or components may be added and/or removed from the implementations of the figures depending on specific deployments and/or applications. Also, one or more disclosed implementations may not be limited to a specific combination of hardware.

Furthermore, certain portions of the invention may be implemented as logic that may perform one or more functions. This logic may include hardware, such as hardwired logic, an application-specific integrated circuit, a field programmable gate array, a microprocessor, software, or a combination of hardware and software.

No element, act, or instruction used in the description of the invention should be construed critical or essential to the invention unless explicitly described as such.

Also, as used herein, the article "a" is intended to include one or more items. Where only one item is intended, the term "a single" or similar language is used. Further, the phrase "based on," as used herein is intended to mean "based, at least in part, on" unless explicitly stated otherwise. In addition, the term "user", as used herein, is intended to be broadly interpreted to include, for example, an electronic device (e.g., a workstation) or a user of an electronic device, unless otherwise stated.

It is intended that the invention not be limited to the particular embodiments disclosed above, but that the invention will include any and all particular embodiments and equivalents falling within the scope of the following appended claims.

The invention claimed is:

1. A computer-implemented method for determining change points in network traffic data based on evaluating time-series data associated with the network traffic data, the method comprising:
   receiving, by a computing device over a network connection, a signal that identifies magnitudes of the network traffic data on a network over time;
   selecting, using the computing device, a first potential change point in the signal;
   identifying, using the computing device, a first portion of the signal incorporating data points before the first potential change point;
   determining, using the computing device, a first cumulative distribution function estimate for the first portion of the signal;
   identifying, using the computing device, a second portion of the signal incorporating data points after the first potential change point;
   determining, using the computing device, a second cumulative distribution function estimate for the second portion of the signal;
   determining, using the computing device, a normalized difference of the first and second cumulative distribution function estimates of the respective first and second portions of the signal; and
   determining, using the computing device, whether the first potential change point qualifies as a valid data traffic magnitude change point based on the normalized difference.

2. The method of claim 1, further comprising:
   comparing the normalized difference to a threshold value; and
   determining whether the potential change point qualifies as a valid data traffic magnitude change point based on the comparing.

3. The method of claim 1, further comprising:
   approximating the signal by a sequence of independent random variables prior to selecting the first potential change point.

4. The method of claim 1, further comprising:
prior to selecting the first potential change point:
determining a trend, a correlation or a cyclic pattern in the signal; and
removing the determined trend, the correlation or the cyclic pattern from the signal.

5. The method of claim 1, wherein the signal is processed online.

6. The method of claim 1, wherein the signal is saved to memory and processed offline.

7. The method of claim 1, wherein it is determined that the first potential change point qualifies as a valid data traffic magnitude change point based on the normalized difference, the method further comprising:
processing the signal to select a second potential change point in the signal;
identifying a third portion of the signal incorporating data points before the second potential change point;
determining a third cumulative distribution function estimate for the third portion of the signal;
identifying a fourth portion of the signal incorporating data points after the second potential change point;
determining a fourth cumulative distribution function estimate for the fourth portion of the signal;
determining a normalized difference of the third cumulative distribution function estimate and the fourth cumulative distribution function estimate of the respective third and fourth portions of the signal; and
determining that the second potential change point qualifies as a valid data traffic magnitude change point based on the normalized difference of the third cumulative distribution function estimate and the fourth cumulative distribution function estimate, wherein the second potential change point represents a change in the signal that is of a different type than a change represented by the first potential change point.

8. A non-transitory electronic device readable storage medium storing instructions to determine change points in network traffic data based on evaluating time-series data associated with the network traffic data that, when executed, cause one or more processors to:
receiving over a network connection a signal that identifies magnitudes of the network traffic data on a network over time;
select a plurality of potential change points in the signal, for each potential change point of the plurality of potential change points:
identify a first portion of the signal incorporating data points before the potential change point;
determine a first cumulative distribution function estimate for the first portion of the signal;
identify a second portion of the signal incorporating data points after the potential change point;
determine a second cumulative distribution function estimate for the second portion of the signal;
determine a normalized difference of the first cumulative distribution function estimate and the second cumulative distribution function estimate;
determine whether the potential change point qualifies as a valid data traffic magnitude change point based on the normalized difference; and
determine at least two valid data traffic magnitude change points in the signal based on normalized differences determined for the plurality of potential change points, wherein the at least two valid data traffic magnitude change points represents at least two types of changes in the signal.

9. The medium of claim 8, further storing instructions that, when executed, cause one or more processors to:
for each potential change point of the plurality of potential change points:
compare the normalized difference to a threshold value, and
determine whether the potential change point qualifies as a valid data traffic magnitude change point based on the comparing.

10. The medium of claim 8, further storing instructions that, when executed, cause one or more processors to:
approximate the signal by a sequence of independent random variables prior to processing the signal.

11. The medium of claim 8, wherein the signal is processed online.

12. The medium of claim 8, wherein the signal is saved to memory and processed offline.

* * * * *